3,239,515
DITHIOCARBOXYLATED CEPHALOSPORINS
Earle M. Van Heyningen, Indianapolis, Ind., assignor to Eli Lilly and Company, Indianapolis, Ind., a corporation of Indiana
No Drawing. Filed Jan. 18, 1965, Ser. No. 426,351
9 Claims. (Cl. 260—243)

This invention relates to novel organic compounds and to methods for their preparation and use.

The novel compounds of the present invention are antibiotic substances having the characteristic ring structure of cephalosporin C but having an N-aminolkayldithiocarbamate-derived moiety in the 3 position instead of the acetoxymethyl group of cephalosporin C. The novel compounds are represented by the following formula:

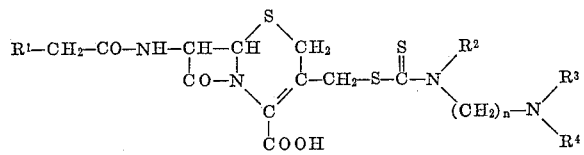

in which $R^1$ is hydrogen, $C_1$-$C_7$ alkyl, $C_1$-$C_7$ alkoxy, $C_1$-$C_7$ alkylmercapto, phenyl, phenoxy, phenylmercapto, thienyl, furyl, benzothienyl, or benzofuryl;
$R^2$ is $C_1$-$C_6$ alkyl;
$n$ is 2 or 3;
$R^3$, taken separately is $C_1$-$C_6$ alkyl;
$R^4$, taken separately is $C_1$-$C_6$ alkyl;
$R^3$ and $R^4$, taken together with the nitrogen atom to which they are attached, are pyrrolidino, piperidino, or morpholino; and
$R^3$ and $R^4$ contain a total of not more than eight carbon atoms.

The novel compounds are readily obtained as the betaines (zwitterionic forms) or as salts with pharmaceutically acceptable cations, and it is to be understood that both forms thereof are included within the scope of the invention.

As used herein, "alkyl" refers refers broadly to primary, secondary, and tertiary alkyl, of both straight-chain and branched-chain configuration, wherein the number of carbon atoms therein is within the designated range, including methyl, ethyl, n-propyl, isopropyl, n-butyl, isobutyl, sec.-butyl, tert.-butyl, n-amyl, isoamyl, 2-amyl, 3-amyl, neopentyl, n-hexyl, isohexyl, 2-hexyl, and (where within the range) n-heptyl, isoheptyl, 3-heptyl, 2-methylhexyl, and the like.

"Alkoxy" refers to alkyl-O- groups wherein the alkyl moiety is as defined above.

"Alkylmercapto" refers to alkyl-S- groups wherein the alkyl moiety is as defined above.

Thienyl, benzothienyl, furyl, and benzofuryl groups may be attached at either the $\alpha$ or $\beta$ position.

"Pharmaceutically acceptable cations" refers to the positive ionic forms of sodium, potassium, lithium, calcium, barium, magnesium, aluminum, and other metals of acceptably low toxicity level, as well as the metalloid ammonium and a variety of organic nitrogen bases, including methylammonium, dimethylammonium, trimethylammonium, tetramethylammonium, choline, the ethylammoniums, procaine, quinine, dibenzylethylenediamine, and the like.

"Halo," as used hereinafter, refers to fluoro, chloro, bromo, or iodo.

In naming the novel compounds of the invention, it is convenient to designate the characteristic saturated fused-ring $\beta$-lactam thiazine structure of the cephalosporins as "cepham,"

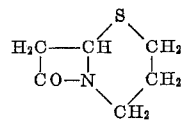

and to name the compounds as derivatives thereof, the term "cephem" referring to the basic ring structure with a single olefinic bond. According to this system, cephalosporin C itself would be named 7-(5'-aminoadipamido)-3-acetoxymethyl-3-cephem-4-carboxylic acid. More informally, it is convenient to name the compounds as derivatives of a hypothetical compound, 7-amino-3-cephem-4-carboxylic acid, and to specify the differences therefrom by naming the radical attached to the CO—NH— group in the 7 position and the N-aminoalkyldithiocarbamate which is employed to replace the acetoxy group in the 3 position. Thus, 7-$\alpha$-thienylacetamido-3-(N - methyl - N-($\beta$ - dimethylaminoethyl) aminothiocarbonylthiomethyl)-3-cephem-4-carboxylic acid is more simply designated as "$\alpha$-thienylmethyl N-methyl-N - ($\beta$ - dimethylaminoethyl) dithiocarbamate cephalosporin."

Illustrative of the compounds lying within the scope of the present invention are the following examples, which may exist either in zwitterionic form or as salts with nontoxic pharmaceutically acceptable cations:

7-$\alpha$-benzofurylacetamido-3-(N-ethyl-N-[3'-diethylaminopropyl]aminothiocarbonylthiomethyl)-3-cephem-4-carboxylic acid 7-ethoxyacetamido-3-(N-ethyl-N-[2'-(N'-methyl-N'-n-hexylamino)ethyl]aminothiocarbonylthiomethyl)-3-cephem-4-carboxylic acid 7-$\alpha$-furylacetamido-3-(N-n-butyl-N-[3'-(N'-ethyl-N'-n-butylamino)propyl]aminothiocarbonylthiomethyl)-3-cephem-4-carboxylic acid 7-isocaproamido-3-(N-ethyl-N-[2'-(N'-ethyl-N'-n-butylamino)ethyl]aminothiocarbonylthiomethyl)-3-cephem-4-carboxylic acid 7-phenylacetamido-3-(N-sec.-butyl-N-[2'-dimethylaminoethyl]aminothiocarbonylthiomethyl)-3-cephem-4-carboxylic acid 7-acetamido-3-(N-n-hexyl-N-[2'-diethylaminoethyl] aminothiocarbonylthiomethyl)-3-cephem-4-carboxylic acid 7-methylmercaptoacetamido-3-(N-n-butyl-N-[2'-diethylaminoethyl]aminothiocarbonylthiomethyl)-3-cephem-4-carboxylic acid 7-$\beta$-thienylacetamido-3-(N-ethyl-N-[2'-morpholinoethyl]aminothiocarbonylthiomethyl)-3-cephem-4-carboxylic acid 7-caprylamido-3-(N-methyl-N-[2'-(N'-ethyl-N'-n-hexylamino)ethyl]aminothiocarbonylthiomethyl-3-3-cephem-4-carboxylic acid 7-$\alpha$-thienylacetamido-3-(N-tert.-butyl-N-[2'-diethylaminoethyl]aminothiocarbonylthiomethyl)-3-cephem-4-carboxylic acid 7-$\alpha$-benzothienylacetamido-3-(N-methyl-N-[2'-(N'-methyl-N'-n-hexylamino)ethyl]aminothiocarbonylthiomethyl)-3-cephem-4-carboxylic acid 7-ethylmercaptoacetamido-3-(N-ethyl-N-[2'-dimethylaminoethyl]aminothiocarbonylthiomethyl)-3-cephem-4-carboxylic acid 7-n-valeramido-3-(N-methyl-N-[2'-(N'-ethyl-N'-isopropylamino)ethyl]aminothiocarbonylthiomethyl)-3-cephem-4-carboxylic acid 7-n-hexyloxyacetamido-3-(N-ethyl-N-[2'-(N'-methyl-N'- ethylamino)ethyl]aminothiocarbonylthiomethyl-3-cephem-4-carboxylic acid 7-phenylmercaptoacetamido-3-(N-n-propyl-N-[2'-di-n-propylaminoethyl]aminothiocarbonylthiomethyl)-3-cephem-4-carboxylic acid 7-neopentylcarboxamido-3-(N-n-hexyl-N-[3'-diethylaminopropyl]aminothiocarbonylthiomethyl)-3-cephem-4-carboxylic acid 7-n-butylmercaptoacetamido-3-(N-methyl-N-[2'-(N'-ethyl-N'-sec.-butylamino)ethyl]aminothiocarbonylthiomethyl)-3-cephem-4-carboxylic acid 7-β-benzothienylacetamido-3-(N-methyl-N-[3'-(N'-ethyl-N-n-hexylamino)propyl]aminothiocarbonylthiomethyl)-3-cephem-4-carboxylic acid 7-phenoxyacetamido-3-(N-methyl-N-[2'-diethylaminoethyl]aminothiocarbonylthiomethyl)-3-cephem-4-carboxylic acid 7-isovaleramido-3-(N-ethyl-N-[2'-pyrrolidinoethyl]-aminothiocarbonylthiomethyl)-3-cephem-4-carboxylic acid 7-nonanoamido-3-(N-n-propyl-N-[3'-di-n-propylaminopropyl]aminothiocarbonylthiomethyl)-3-cephem-4-carboxylic acid 7-propionamido-3-(N-ethyl-N-[2'-piperidinoethyl]-aminothiocarbonylthiomethyl)-3-cephem-4-carboxylic acid 7-methoxyacetamido-3-(N-ethyl-N-[3'-dimethylaminopropyl]aminothiocarbonylthiomethyl)-3-cephem-4-carboxylic acid 7-β-furylacetamido-3-(N-neopentyl-N-[2'-dimethylaminoethyl]aminothiocarbonylthiomethyl)-3-cephem-4-carboxylic acid 7-n-butyramido-3-(N-isopropyl-N-[2'-dimethylaminoethyl]aminothiocarbonylthiomethyl)-3-cephem-4-carboxylic acid 7-β-benzofurylacetamido-3-(N-ethyl-N-[2'-di-n-butylaminoethyl]aminothiocarbonylthiomethyl)-3-cephem-4-carboxylic acid While the compounds of the present invention have been defined in terms of a structural formula which depicts the novel structural features of the claimed compounds and which indicates the presence therein of certain well-known organic radicals, including alkyl, phenyl, thienyl, benzothienyl, furyl, benzofuryl, pyrrolidino, piperidino, and morpholino, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to lie within the scope of the invention. Among such substituent atoms and radicals are halo, hydroxy, nitro, lower alkyl, trifluoromethyl, methoxy, methylmercapto, cyano, hydroxymethyl, β-hydroxyethyl, acetyl, acetamido, and the like.

The compounds of the present invention are readily prepared from an appropriate derivative of 7-aminocephalosporanic acid (i.e., a derivative thereof having the desired acylamido group in the 7 position and the characteristic acetoxymethyl group in the 3 position) by displacement of the acetoxyl group with an N-aminoalkyldithiocarbamate of appropriate structure. The reaction is conveniently carried out by dissolving a salt of the 7-aminocephalosporanic acid compound in water, adding an aqueous solution of an alkali-metal salt of the N-aminoalkyldithiocarbamate, preferably in at least a small molar excess, and stirring and warming at ordinary or somewhat elevated temperature for several hours. The N-aminoalkyldithiocarbamate solution should not be more basic than about 7.5–8, and will thus generally require acidification with hydrochloric acid, sulfuric acid, or the like before the solutions are mixed. The reaction may be carried out at temperatures between about 25 and about 100° C., preferably around 40 to 60° C., and for periods of about one to about 24 hours or more, the time necessary for complete reaction varying inversely with the temperature, and extended reaction times being without adverse effect under the preferred temperature conditions. The products thus obtained are generally water soluble, but may be salted out as a yellow glass by adding sodium chloride to about 50 percent of saturation, under which conditions the starting materials and by-products remain largely in solution. Many of the products are readily purified by dissolving in chloroform, washing with 50 percent-saturated aqueous sodium chloride solution to remove impurities, diluting with ether, and crystallizing.

As an alternative method, 7-aminocephalosporanic acid can be reacted with the N-aminoalkyldithiocarbamate, and the resulting intermediate can be reacted with an appropriate acylating agent to introduce the desired substituent in the 7 position.

The desired cephalosporin C starting material, having the acetoxymethyl group in the 3 position, is readily prepared by means now well-known in the art. The most convenient and economical method involves acylating 7-aminocephalosporanic acid with an acylating agent having the desired structure under conventional conditions. A convenient acylating agent is, for example, the appropriate $R^1$-substituted acetyl chloride or bromide. The acylation is carried out in water or in an appropriate organic solvent, preferably under substantially neutral conditions and preferably at reduced temperature, i.e., above the freezing point of the reaction mixture and up to about 20° C. In a typical procedure, 7-aminocephalosporanic acid is commingled with aqueous 50 volume-percent acetone and a sufficient quantity of sodium bicarbonate to promote solution, the concentration of 7-aminocephalosporanic acid being about one to about four percent by weight. The solution is cooled to around 0 to 5° C., and a solution of the acylating agent is added in about 20 percent excess, with stirring and cooling. The mixture is then allowed to warm to room temperature, after which it is acidified to around pH 2 and extracted with ethyl acetate or other immiscible organic solvent. The ethyl acetate extract is adjusted to around pH 4.5 with potassium hydroxide or other base and is back-extracted into water. The water solution is separated and evaporated to dryness. The residue is taken up in the minimum quantity of water, and the acylated product is precipitated by adding a large excess of acetone and, if necessary, ether. The crystalline material obtained thereby is filtered, washed with acetone and dried.

The N-aminoalkyldithiocarbamates employed in the present invention are conveniently prepared by the method of Bögemann, Methoden der Organischen Chemie (Houben-Weyl), Stuttgart: Georg Thiems Verlag, 1955, volume 9, page 826. A solution of sodium hydroxide (0.2 mole) in 35 ml. of water is cooled to 0° C. and mixed with an amine (0.2 mole) of the appropriate structure. Then carbon disulfide (0.2 mole) is added dropwise and the mixture is stirred for one hour. In some cases, the desired N-aminoalkyldithiocarbamate precipitates as the sodium salt from the reaction mixture, while in other cases it remains in solution. In all cases, it is desirable to add several volumes of acetone to effect or complete the precipitation of the product. The solid is filtered off and air-dried, and is conveniently recrystallized from ethyl acetate or from aqueous acetone. The products are light yellow to white materials having disagreeable odors. The ultraviolet spectra are typical; and while the amino groups can be titrated, the dithiocarbamate group decomposes at pH levels below 5. The foregoing technique is readily applicable to the preparation of the alkali-metal salts of the N-aminoalkyldithiocarbamates employed in the present invention, as illustrated in the following table, where the substituents on the carbamate nitrogen are defined as in the structural formula hereinabove:

| R² | R³ | R⁴ | n | Melting Point, °C. | Yield, percent | C Calc. | C Found | H Calc. | H Found | N Calc. | N Found |
|---|---|---|---|---|---|---|---|---|---|---|---|
| Methyl | Methyl | Methyl | 2 | 75–77 | 55 | 33.01 | 32.79 | 6.93 | 6.93 | 12.83 | 13.12 |
| Do | Ethyl | Ethyl | 2 | 80–82 | 93 | 39.00 | 39.69 | 7.77 | 7.52 | 11.37 | 11.57 |
| Do | n-Propyl | n-Propyl | 2 | — | 96 | 43.76 | 43.84 | 8.44 | 8.67 | 10.20 | 10.50 |
| Do | Morpholino | | 2 | 230–233 d. | 15.9 | 36.90 | 36.63 | 6.67 | 6.58 | 10.76 | 10.38 |
| Ethyl | Ethyl | Ethyl | 2 | 78–79 d. | 76 | 41.36 | 41.30 | 8.11 | 8.05 | 10.72 | 10.83 |
| Methyl | do | do | 3 | 77–79 d. | 96 | — | — | — | — | 11.56 | 11.66 |
| Do | Piperidino | | 3 | 115–119 | 29 | 44.08 | 44.50 | 7.70 | 7.69 | 10.28 | 10.24 |

[a] All products were sodium salts. All were monohydrates except the last two, which were anhydrous.

The invention will be more readily understood from the following operating examples, which are submitted as illustrations only, and not by way of limitation.

In all cases the following procedure was employed with only slight variations to prepare the designated compound. A 0.0012 mole portion of the appropriate sodium N-aminoalkyldithiocarbamate was dissolved in 10 ml. of water, adjusted to pH 7.5–8 with 1 N hydrochloric acid, combined with an equimolar amount of the appropriate sodium 7-acylamidocephalosporanate, and heated at 40–45° C. in a thermostated oil bath for 24 hours, at the end of which time the solution was generally clear. The product was precipitated as a yellow glass by addition of an equal volume of aqueous saturated sodium chloride solution and chilling for several hours. The supernatant solution was decanted from the solid phase and the solid was dissolved in 25 to 50 ml. of chloroform. The chloroform solution was washed about 10 times with successive 12–15 ml. portions of 50 percent saturated aqueous sodium chloride solution. In some cases, especially toward the end of the wash, troublesome emulsions were formed, but were readily broken by centrifuging. The washing was conveniently followed by qualitative ultraviolet spectra of the wash solutions; disappearance of the spectrum for starting material and appearance of the spectrum for the product indicated when washing was complete. The washed chloroform solution was evaporated to half volume or less, then diluted with ether, and chilled. The sodium salt of the desired product separated as a fine powder, which was centrifuged and dried under vacuum.

The melting points of the products were not sharp, owing to the fact that the compounds tend to decompose at or around their melting point, and the melting points therefore vary, depending upon the temperature of the melting-point block when the compounds were first applied. All of the products, however, had infrared spectra consistent with the expected structure and gave one spot against *Bacillus subtilis* in bio-autographs of paper chromatograms, which were developed with methyl ethyl ketone saturated with water. These data, together with the ultraviolet spectra, titrations, and analyses, were sufficient to characterize the substances fully.

EXAMPLE 1

α-*Thienylmethyl N-methyl-N-(2'-dimethylaminoethyl)-dithiocarbamate cephalosporin*

7-α-thienylacetamido-3-(N-methyl-N - [2'-dimethylaminoethyl]aminothiocarbonylthiomethyl) - 3- cephem-4-carboxylic acid betaine was obtained from 7-α-thienylacetamidocephalosporanic acid and N-methyl-N-(2'-dimethylaminoethyl)dithiocarbamate. The reaction mixture required several adjustments to pH 8 in the initial few hours of reaction at room temperature. After 48 hours at room temperature, the product began to precipitate. After a total of 72 hours, the solid product was filtered off, dissolved in the minimum amount of hot water, concentrated under vacuum, and crystallized. Yield, 24.2 percent of theory. $pK'_a$, 4.65 and 7.5. Ultraviolet absorption maxima at 244 and 270 mμ ($\epsilon$=18,500 and 20,590, respectively).

*Analysis.*—Calc.: C, 46.67; H, 5.09; N, 10.89. Found: C, 46.70; H, 5.29; N, 10.60.

EXAMPLE 2

α-*Thienylmethyl N-methyl-N-(2'-diethylaminoethyl)-dithiocarbamate cephalosporin*

7-α-thienylacetamido-3-(N-methyl-N - [2'-diethylaminoethyl]-aminothiocarbonylthiomethyl)-3-cephem-4-carboxylic acid betaine was obtained from 7-α-thienylacetamidocephalosporanic acid and N-methyl-N-(2'-diethylaminoethyl)dithiocarbamate. The pH-adjusted solution was heated at 40° C. for several days, during which time a white precipitate of the zwitterionic product separated. The solid was filtered off and dissolved in boiling water. The resulting solution was chilled and the product was thrown down by adding an equal volume of methanol. The resulting gelatinous material was collected and dried over potassium hydroxide pellets. Yield, 18 percent of theory. $pK'_a$, 4.72 and 7.9. Ultraviolet absorption maximum at 270 mμ ($\epsilon$=20,000).

*Analysis.*—Calc.: C, 48.68; H, 5.57; N, 10.32. Found: C, 48.39; H, 5.77; N, 10.14.

EXAMPLE 3

α-*Thienylmethyl N-methyl-N-(2'-di-n-propylaminoethyl)-dithiocarbamate cephalosporin*

7-α-thienylacetamido-3-(N-methyl - N - [2'-di-n-propylaminoethyl]aminothiocarbonylthiomethyl) - 3 - cephen-4-carboxylic acid betaine was obtained from 7-α-thienylacetamidocephalosporanic acid and N-methyl-N-(2'-di-n-propylaminoethyl)dithiocarbamate. Yield, 5.4 percent of theory. $pK'_a$, 4.6 and 7.6.

*Analysis.*—Calc.: C, 50.50; H, 6.00; N, 9.82. Found: C, 50.40; H, 5.90; N, 9.84.

EXAMPLE 4

α-*Thienylmethyl N-methyl-N-(2'-morpholinoethyl)-dithiocarbamate cephalosporin*

7-α-thienylacetamido-3-(N-methyl - N - [2'-morpholinoethyl]-aminothiocarbonylthiomethyl) - 3-cephem-4-carboxylic acid sodium salt was obtained from 7-α-thienylacetamidocephalosporanic acid and N-methyl-N-(2'-morpholinoethyl)dithiocarbamate. Yield, 41.4 percent of theory. $pK'_a$, 4.35 and 5.55. Ultraviolet absorption maximum at 272 mμ ($\epsilon$=17,600).

*Analysis.*—Calc.: C, 45.05; H, 4.70; N, 9.68. Found: C, 44.83; H, 4.60; N, 9.63.

EXAMPLE 5

α-*Thienylmethyl N-ethyl-N-(2'-diethylaminoethyl)-dithiocarbamate cephalosporin*

7-α-thienylacetamido-3-(N-ethyl - N - [2'-diethylaminoethyl]aminothiocarbonylthiomethyl) - 3- cephem-4-carboxylic acid betaine was obtained from 7-α-thienylacetamidocephalosporanic acid and N-ethyl-N-(2'-diethylaminoethyl)dithiocarbamate. Yield, 30 percent of theory. $pK'_a$, 4.75 and 7.88.

*Analysis.*—Calc.: C, 47.31; H, 6.04; N, 9.60. Found: C, 47.52; H, 5.98; N, 9.82.

EXAMPLE 6

*α-Thienylmethyl N-methyl-N-(3'-diethylaminopropyl)- dithiocarbamate cephalosporin*

7-α-thienylacetamido-3-(N-methyl-N - [3'-diethylaminopropyl]aminothiocarbonylthiomethyl)- 3-cephem-4-carboxylic acid betaine was obtained from 7-α-thienylacetamidocephalosporanic acid and N-methyl-N-(3'-diethylaminopropyl)dithiocarbamate. Yield, 21 percent of theory. pK'$_a$, 4.8 and 9.05. Ultraviolet absorption maximum at 269 mμ (ε=20,100).

*Analysis.*—Calc.: C, 48.05; H, 5.96; N, 9.74. Found: C, 47.86; H, 5.49; N, 10.06.

EXAMPLE 7

*α-Thienylmethyl N-methyl-N-(3'-piperidinopropyl)- dithiocarbamate cephalosporin*

7-α-thienylacetamido-3-(N-methyl-N- [3'-piperidinopropyl]aminothiocarbonylthiomethyl)- 3-cephem-4-carboxylic acid betaine was obtained from 7-α-thienylacetamidocephalosporanic acid and N-methyl-N-(3'-piperidinopropyl)dithiocarbamate. Yield, 11.8 percent of theory. pK'$_a$, 4.75 and 8.75. Ultraviolet absorption maximum at 270 mμ (ε=14,000).

*Analysis.*—Calc.: C, 47.65; H, 5.99; N, 9.26. Found: C, 47.48; H, 5.51; N, 9.03.

EXAMPLE 8

*α-Thienylmethyl N-n-propyl-N-(2'-diethylaminoethyl)- dithiocarbamate cephalosporin*

7-α-thienylacetamido-3-(N-n-propyl-N - [2'-diethylaminoethyl]aminothiocarbonylthiomethyl)-3-cephem-4-carboxylic acid betaine was obtained from 7-α-thienylacetamidocephalosporanic acid and N-n-propyl-N-(2'-diethylaminoethyl)dithiocarbamate. pK'$_a$, 4.73 and 7.9. Ultraviolet absorption maximum at 271 mμ (ε=16,500).

The compounds of the present invention are characterized by resistance to the destructive action of penicillinase, high activity against a variety of Gram-positive pathogens, and some degree of activity against many of the Gram-negative pathogens.

I claim:

1. The compounds represented by the following formula:

$$R^1-CH_2-CO-NH-CH-C \begin{matrix} S \\ N \end{matrix} CH_2 \\ CO-N \quad C-CH_2-S-C-N \begin{matrix} R^2 \\ (CH_2)_n-N \begin{matrix} R^3 \\ R^4 \end{matrix} \end{matrix} \\ COOH$$

wherein $R^1$ is a member of the group consisting of hydrogen, $C_1$–$C_7$ alkyl, $C_1$–$C_7$ alkoxy, $C_1$–$C_7$ alkylmercapto, phenyl, phenoxy, phenylmercapto, thienyl, furyl, benzothienyl, and benzofuryl;

$R^2$ is $C_1$–$C_6$ alkyl;

$n$ is 2 or 3;

$R^3$, taken separately, is $C_1$–$C_6$ alkyl;

$R^4$, taken separately, is $C_1$–$C_6$ alkyl;

$R^3$ and $R^4$, taken together with the nitrogen atom to which they are attached, are a member of the group consisting of pyrrolidino, piperidino, and morpholino; and $R^3$ and $R^4$ contain a total of not more than eight carbon atoms;

and the salts thereof with pharmaceutically acceptable cations.

2. 7 - α - thienylacetamido-3-(N-methyl-n-[2'-dimethylaminoethyl]aminothiocarbonylthiomethyl) - 3 - cephem-4-carboxylic acid.

3. 7 - α - thienylacetamido - 3-(N-methyl-N-[2'-diethylaminoethyl]aminothiocarbonylthiomethyl) - 3 - cephem-4-carboxylic acid.

4. 7 - α - thienylacetamido - 3 - (N - methyl-N-[2'-di-n - propylaminoethyl]aminothiocarbonylthiomethyl) - 3 - cephem-4-carboxylic acid.

5. 7 - α - thienylacetamido - 3-(N-methyl-N-[2'morpholinoethyl]aminothiocarbonylthiomethyl) - 3 - cephem - 4- carboxylic acid.

6. 7 - α - thienylacetamido - 3 - (N-ethyl-N-[2'-diethylaminoethyl]aminothiocarbonylthiomethyl) - 3 - cephem-4-carboxylic acid.

7. 7 - α - thienylacetamido - 3 - (N-methyl-N[3'-diethylaminopropyl]aminothiocarbonylthiomethyl) - 3 - cephem-4-carboxylic acid.

8. 7 - α - thienylacetamido - 3 - (N-methyl-N-[3'-piperidinopropyl]aminothiocarbonylthiomethyl) - 3 - cephem-4-carboxylic acid.

9. 7 - α - thienylacetamido - 3 - (N-n-propyl-N-[2'-diethylaminoethyl]aminothiocarbonylthiomethyl) - 3 - cephem-4-carboxylic acid.

No references cited.

IRVING MARCUS, *Primary Examiner.*